US011743187B2

(12) United States Patent
Xiong et al.

(10) Patent No.: US 11,743,187 B2
(45) Date of Patent: *Aug. 29, 2023

(54) APPLICATION PROGRAMING INTERFACE (API) GATEWAY CLUSTER CONTROL METHOD AND API GATEWAY CLUSTER

(71) Applicant: Huawei Cloud Computing Technologies Co., Ltd., Guizhou (CN)

(72) Inventors: Wenhui Xiong, Shenzhen (CN); Zeyi Huang, Shenzhen (CN)

(73) Assignee: HUAWEI CLOUD COMPUTING TECHNOLGOIES CO., LTD., Guizhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,094

(22) Filed: Jun. 2, 2022

(65) Prior Publication Data
US 2022/0303216 A1 Sep. 22, 2022

Related U.S. Application Data

(63) Continuation of application No. 17/024,310, filed on Sep. 17, 2020, now Pat. No. 11,362,952, which is a
(Continued)

(51) Int. Cl.
*H04L 47/12* (2022.01)
*G06F 9/54* (2006.01)
(Continued)

(52) U.S. Cl.
CPC ............. *H04L 47/12* (2013.01); *G06F 9/547* (2013.01); *H04L 47/19* (2013.01); *H04L 67/1008* (2013.01)

(58) Field of Classification Search
None
See application file for complete search history.

(56) References Cited

U.S. PATENT DOCUMENTS 10,104,704 B2 10/2018 Sharma et al.
10,749,711 B2 8/2020 Mukundan et al.
(Continued)

FOREIGN PATENT DOCUMENTS

CN 101741690 A 6/2010
CN 102984077 A 3/2013
(Continued)

OTHER PUBLICATIONS

Neghabi et al., "Load Balancing Mechanisms in the Software Defined Networks: A Systematic and Comprehensive Review of the Literature", Jan. 1, 2018, IEEE, IEEE Access (vol. 6, pp. 14159-14178) (Year: 2018).*
(Continued)

*Primary Examiner* — Davoud A Zand
(74) *Attorney, Agent, or Firm* — Conley Rose, P.C.

(57) ABSTRACT

An application programming interface (API) gateway cluster control method includes determining, by an API gateway cluster, that a quantity of API requests received per unit of time exceeds a traffic control parameter, obtaining a load parameter of the API gateway cluster and a load parameter of a service cluster, determining, based on the load parameter of the API gateway cluster, that the API gateway cluster is congested, determining, based on the load parameter of the service cluster, that the service cluster is not congested, and scaling out the API gateway cluster.

19 Claims, 7 Drawing Sheets

Related U.S. Application Data continuation of application No. PCT/CN2018/079741, filed on Mar. 21, 2018.

(51) Int. Cl.
 *H04L 47/19* (2022.01)
 *H04L 67/1008* (2022.01)

(56) References Cited

U.S. PATENT DOCUMENTS

| | | | |
|---|---|---|---|
| 11,048,660 | B2 | 6/2021 | Poitrey |
| 2006/0009213 | A1 | 1/2006 | Sturniolo et al. |
| 2008/0225706 | A1 | 9/2008 | Lange |
| 2013/0132553 | A1* | 5/2013 | Stratton ............. G06F 11/3006 709/223 |
| 2013/0297802 | A1 | 11/2013 | Laribi et al. |
| 2016/0112503 | A1 | 4/2016 | Yang |
| 2016/0315999 | A1* | 10/2016 | Sun ....................... G06F 9/5016 |
| 2016/0352867 | A1* | 12/2016 | Subbarayan ........ H04L 41/0813 |
| 2017/0085415 | A1 | 3/2017 | Ameixiera |
| 2017/0102866 | A1* | 4/2017 | Calvillo ............. G06Q 30/0251 |
| 2017/0272371 | A1 | 9/2017 | Lin |
| 2019/0124671 | A1 | 4/2019 | Starsinic et al. |
| 2021/0326298 | A1 | 10/2021 | Paitrey |

FOREIGN PATENT DOCUMENTS

| | | | | |
|---|---|---|---|---|
| CN | 103716372 | A | | 4/2014 |
| CN | 104168133 | A | | 11/2014 |
| CN | 104243337 | A | | 12/2014 |
| CN | 105024842 | A | | 11/2015 |
| CN | 105827446 | A | | 8/2016 |
| CN | 107145393 | A | | 9/2017 |
| CN | 107426034 | A * | 12/2017 | ......... G06F 9/45558 |
| CN | 107659460 | A | | 2/2018 |
| EP | 3267639 | A1 | | 1/2018 |

OTHER PUBLICATIONS

Xu et al., "Lightweight and Adaptive Service API Performance Monitoring in Highly Dynamic Cloud Environment", Jun. 1, 2017, IEEE, 2017 IEEE International Conference on Services Computing (SCC) (pp. 35-43) (Year: 2017).*

* cited by examiner

APPLICATION PROGRAMING INTERFACE (API) GATEWAY CLUSTER CONTROL METHOD AND API GATEWAY CLUSTER

CROSS-REFERENCE TO RELATED APPLICATIONS

This is a continuation of U.S. patent application Ser. No. 17/024,310 filed on Sep. 17, 2020, which is a continuation of International Patent Application No. PCT/CN2018/079741 filed on Mar. 21, 2018. Both of the aforementioned applications are hereby incorporated by reference in their entireties.

TECHNICAL FIELD

This application relates to network technologies, and in particular, to an application programming interface (API) gateway cluster control method and an API gateway cluster.

BACKGROUND

An API gateway is an entry of a service. Each application accesses a service using the API gateway. The API gateway integrates functions such as routing, authentication, traffic control, security, and caching. Applications of different users can use these functions in the API gateway to access services. The API gateway centrally provides these services, and this saves energy of application developers and helps the developers focus more on a service capability of developing applications.

An API request sent by an application of a user is forwarded to a target service using the API gateway. Therefore, traffic control may be performed on the API request in the API gateway, to prevent stable running of a service from being affected due to receiving an excessive large quantity of API requests by the service. A conventional API gateway usually performs traffic control by setting a traffic control parameter. When detecting that a quantity of requests of a specific API that are received by the API gateway exceeds the preset traffic control parameter, the API gateway returns rejection information to an application, and rejects sending the API request to a service, to protect stable running of a service cluster.

An existing API gateway control method has relatively low precision.

SUMMARY

Embodiments of the present disclosure provide an API gateway cluster control method and an API gateway cluster, to improve control precision of the API gateway cluster.

According to an aspect, an embodiment of the present disclosure provides an API gateway cluster control method. The method is applied to a service provisioning system, the service provisioning system includes an API gateway cluster and a service cluster, and an API request sent by an application of a user accesses the service cluster using the API gateway cluster. The method includes determining, by the API gateway cluster, that a quantity of API requests received by the service provisioning system exceeds a traffic control parameter, in other words, counting, by the API gateway cluster, a quantity of API requests sent by the application to the service provisioning system per unit of time, where a counting method corresponds to a setting of the traffic control parameter, obtaining, by the API gateway cluster, a load parameter of the API gateway cluster, obtaining, by the API gateway cluster, a load parameter of the service cluster, determining, by the API gateway cluster based on the load parameter of the API gateway cluster, that the API gateway cluster is congested, determining, by the API gateway cluster based on the load parameter of the service cluster, that the service cluster is not congested, and scaling out the API gateway cluster.

The API gateway cluster and the service cluster are comprehensively determined based on the load parameter of the API gateway cluster and the load parameter of the service cluster, and the API gateway cluster is scaled out based on a determining result such that precision of the API gateway cluster control method is improved, and normal running of the API gateway cluster and the service cluster is ensured.

In a possible design, the API gateway cluster includes an API gateway controller and at least one API routing apparatus, and the load parameter of the API gateway cluster includes a load parameter of the at least one API routing apparatus.

The API gateway controller implements steps of obtaining the load parameter of the API gateway cluster, obtaining the load parameter of the service cluster, determining that the API gateway cluster is congested, and determining that the service cluster is not congested.

The scaling out the API gateway cluster includes determining, by the API gateway controller, that the API gateway cluster needs to be scaled out, and generating a scale-out instruction, and newly establishing, by the API gateway controller, an API routing apparatus in the API gateway cluster based on the scale-out instruction.

The API routing apparatus in the API gateway cluster is a component with relatively heavy load. By scaling out the API routing apparatus, precision of the API gateway cluster control method is further improved.

In another aspect, an embodiment of the present disclosure provides an API gateway cluster control method. The method includes determining, by an API gateway cluster, that a quantity of API requests received by a service provisioning system exceeds a traffic control parameter, obtaining, by the API gateway cluster, a load parameter of the API gateway cluster, obtaining, by the API gateway cluster, a load parameter of a service cluster, determining, by the API gateway cluster based on the load parameter of the API gateway cluster, that the API gateway cluster is not congested, determining, by the API gateway cluster based on the load parameter of the service cluster, that the service cluster is not congested, and updating, by the API gateway cluster, the traffic control parameter.

In a possible design, the traffic control parameter includes a user-level traffic control parameter, and the updating the traffic control parameter includes increasing the user-level traffic control parameter.

In a possible design, the traffic control parameter includes an API-request-level traffic control parameter, and the updating the traffic control parameter includes increasing the API-request-level traffic control parameter.

Specifically, the traffic control parameter may be increased by proportion or by a fixed value.

The API gateway cluster and the service cluster are comprehensively determined based on the load parameter of the API gateway cluster and the load parameter of the service cluster, and when it is determined that neither the API gateway cluster nor the service cluster is congested, the preset traffic control parameter is increased, to better provide an API gateway service for a user. In addition, increasing the traffic control parameter also increases a quantity of API requests that can be processed by the API gateway cluster and the service cluster, and improves working efficiency of the API gateway cluster and the service cluster.

According to another aspect, an embodiment of the present disclosure provides an API gateway cluster, including an API gateway controller and at least one API routing apparatus.

The API gateway controller is configured to determine that a quantity of API requests received by the API gateway cluster exceeds a traffic control parameter, obtain a load parameter of the at least one API routing apparatus, obtain a load parameter of a service cluster such that an application accesses the service cluster using the API gateway cluster, determine, based on the load parameter of the at least one API routing apparatus, that the API gateway cluster is congested, determine, based on the load parameter of the service cluster, that the service cluster is not congested, and newly establish an API routing apparatus in the API gateway cluster.

According to another aspect, an embodiment of the present disclosure provides an API gateway cluster, including an API gateway controller and at least one API routing apparatus.

The API gateway controller is configured to determine that a quantity of API requests received by the API gateway cluster exceeds a traffic control parameter, obtain a load parameter of the at least one API routing apparatus, obtain a load parameter of a service cluster such that an application accesses the service cluster using the API gateway cluster, determine, based on the load parameter of the at least one API routing apparatus, that the API gateway cluster is not congested, determine, based on the load parameter of the service cluster, that the service cluster is not congested, and update the traffic control parameter.

In a possible design, the traffic control parameter includes a user-level traffic control parameter, and the updating the traffic control parameter includes increasing the user-level traffic control parameter.

In a possible design, the traffic control parameter includes an API-request-level traffic control parameter, and the updating the traffic control parameter includes increasing the API-request-level traffic control parameter.

According to another aspect, an embodiment of the present disclosure provides an API gateway cluster. The API gateway cluster includes at least one computing device, each computing device includes a processor and a memory, and the processor is configured to execute program code stored in the memory, to implement the API gateway controller and the at least one API routing apparatus in the foregoing aspects, to perform the following steps receiving an API request sent by an application, where the application accesses a service in a service cluster using the API request, determining that a quantity of API requests exceeds a traffic control parameter, obtaining a load parameter of the API gateway cluster, obtaining a load parameter of the service cluster, determining, based on the load parameter of the API gateway cluster, that the API gateway cluster is congested, determining, based on the load parameter of the service cluster, that the service cluster is not congested, and scaling out the API gateway cluster.

In a possible design, the load parameter of the API gateway cluster includes a load parameter of the at least one API routing apparatus, and the scaling out the API gateway cluster includes newly establishing an API routing apparatus in the API gateway cluster according to an instruction of the API gateway controller.

When the API gateway cluster includes a plurality of computing devices, a processor in each computing device executes program code stored in a memory of the computing device in which the processor is located, to implement all or some functions/modules/databases of the API gateway controller, or implement one or more API routing apparatuses.

According to another aspect, an embodiment of the present disclosure provides an API gateway cluster. The API gateway cluster includes at least one computing device, each computing device includes a processor and a memory, and the processor is configured to execute program code stored in the memory, to implement the API gateway controller and the at least one API routing apparatus in the foregoing aspects, to perform the following steps receiving an API request sent by an application, where the application accesses a service in a service cluster using the API request, determining that a quantity of API requests exceeds a traffic control parameter, obtaining a load parameter of the API gateway cluster, obtaining a load parameter of the service cluster, determining, based on the load parameter of the API gateway cluster, that the API gateway cluster is not congested, determining, based on the load parameter of the service cluster, that the service cluster is not congested, and updating the traffic control parameter.

In a possible design, the traffic control parameter includes a user-level traffic control parameter, and the updating the traffic control parameter includes increasing the user-level traffic control parameter.

In a possible design, the traffic control parameter includes an API-request-level traffic control parameter, and the updating the traffic control parameter includes increasing the API-request-level traffic control parameter.

When the API gateway cluster includes a plurality of computing devices, a processor in each computing device executes program code stored in a memory of the computing device in which the processor is located, to implement all or some functions/modules/databases of the API gateway controller, or implement one or more API routing apparatuses.

According to another aspect, an embodiment of the present disclosure provides a computing-device-readable storage medium. The computing-device-readable storage medium includes an instruction, and the instruction is executed by the computing device in the foregoing API gateway cluster, to perform the following steps receiving an API request sent by an application, where the application accesses a service in a service cluster using the API request, determining that a quantity of API requests exceeds a traffic control parameter, obtaining a load parameter of the API gateway cluster, obtaining a load parameter of the service cluster, determining, based on the load parameter of the API gateway cluster, that the API gateway cluster is congested, determining, based on the load parameter of the service cluster, that the service cluster is not congested, and scaling out the API gateway cluster.

In a possible design, the API gateway cluster includes at least one API routing apparatus, and the load parameter of the API gateway cluster includes a load parameter of the at least one API routing apparatus, and the scaling out the API gateway cluster includes newly establishing an API routing apparatus in the API gateway cluster according to an instruction of an API gateway controller.

According to another aspect, an embodiment of the present disclosure provides a computing-device-readable storage medium. The computing-device-readable storage medium includes an instruction, and the instruction is executed by the computing device in the foregoing API gateway cluster, to perform the following steps receiving an API request sent by an application, where the application accesses a service in a service cluster using the API request, determining that a quantity of API requests exceeds a traffic control parameter, obtaining a load parameter of the API gateway cluster, obtaining a load parameter of the service cluster, determining, based on the load parameter of the API gateway cluster, that the API gateway cluster is not congested, determining, based on the load parameter of the service cluster, that the service cluster is not congested, and updating the traffic control parameter.

According to another aspect, an embodiment of the present disclosure provides a computing device program product. The computing device program product includes an instruction, and the instruction is executed by the computing device in the foregoing API gateway cluster, to perform the following steps receiving an API request sent by an application, where the application accesses a service in a service cluster using the API request, determining that a quantity of API requests exceeds a traffic control parameter, obtaining a load parameter of the API gateway cluster, obtaining a load parameter of the service cluster, determining, based on the load parameter of the API gateway cluster, that the API gateway cluster is congested, determining, based on the load parameter of the service cluster, that the service cluster is not congested, and scaling out the API gateway cluster.

In a possible design, the API gateway cluster includes at least one API routing apparatus, and the load parameter of the API gateway cluster includes a load parameter of the at least one API routing apparatus, and the scaling out the API gateway cluster includes newly establishing an API routing apparatus in the API gateway cluster according to an instruction of an API gateway controller.

According to another aspect, an embodiment of the present disclosure provides a computing device program product. The computing device program product includes an instruction, and the instruction is executed by the computing device in the foregoing API gateway cluster, to perform the following steps receiving an API request sent by an application, where the application accesses a service in a service cluster using the API request, determining that a quantity of API requests exceeds a traffic control parameter, obtaining a load parameter of the API gateway cluster, obtaining a load parameter of the service cluster, determining, based on the load parameter of the API gateway cluster, that the API gateway cluster is not congested, determining, based on the load parameter of the service cluster, that the service cluster is not congested, and updating the traffic control parameter.

DESCRIPTION OF EMBODIMENTS

The following describes technical solutions in embodiments of the present disclosure with reference to the accompanying drawings in the embodiments of the present disclosure.

Figure 1:
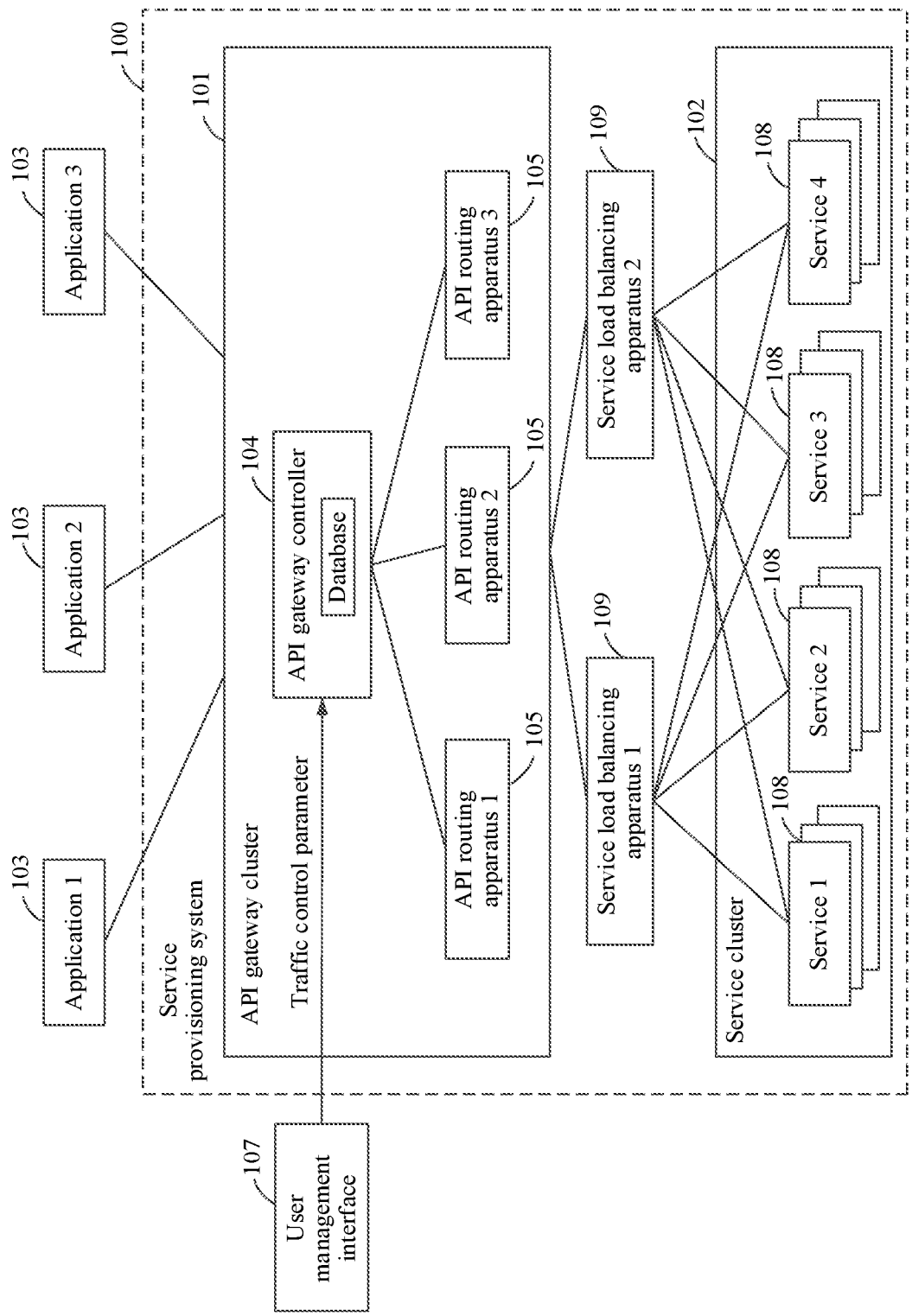
FIG. 1 is a schematic architectural diagram of a service provisioning system according to an embodiment of the present disclosure.

FIG. 1 is a schematic architectural diagram of a service provisioning system according to an embodiment of the present disclosure. As shown in FIG. 1, the service provisioning system 100 includes an API gateway cluster 101 and a service cluster 102.

The API gateway cluster 101 is used as an external interface of the service provisioning system 100 and is connected to at least one application 103. The API gateway cluster 101 receives an API request sent by each application 103, and forwards the received API request to the service cluster 102. Each application 103 belongs to one user.

The API request is a request generated by the application 103 for accessing an API of a service 108 in the service cluster 102. For example, a developer of a service 1 publishes an API for accessing the service 1 on the API gateway cluster 101, and the application 103 generates an API request corresponding to the API, and accesses the service 1 using the API request. The API request carries request parameters such as a user identifier, an API identifier, and address information that is of a sender. API requests generated by applications 103 for accessing a same API are API requests of a same type. Therefore, the API requests of the same type may have different request parameters such as a user identifier and address information that is of a sender, but the API requests of the same type have a same API identifier, and the API identifier is also referred to as an API name. An API request X refers to an API request that carries an API identifier X. An interface between each application 103 and the API gateway cluster 101 may be an interface of a representational state transfer (REST) style or an interface provided in a software development kit (SDK).

The API gateway cluster 101 includes at least one API gateway controller 104 and at least one API routing apparatus 105.

The API routing apparatus 105 is configured to forward the API request to the service cluster 102, for example, determine a routing path of the API request. When the API gateway controller 104 determines that responding to the API request should be rejected, the API routing apparatus 105 is configured to intercept the API request, and send a rejection response to the application 103. The API routing apparatus 105 is further configured to intercept the API request based on a blacklist, generate a rejection response, and send the rejection response to the application 103. The API gateway controller 104 is configured to process the API request, and manage and control each API routing apparatus 105.

Figure 2:
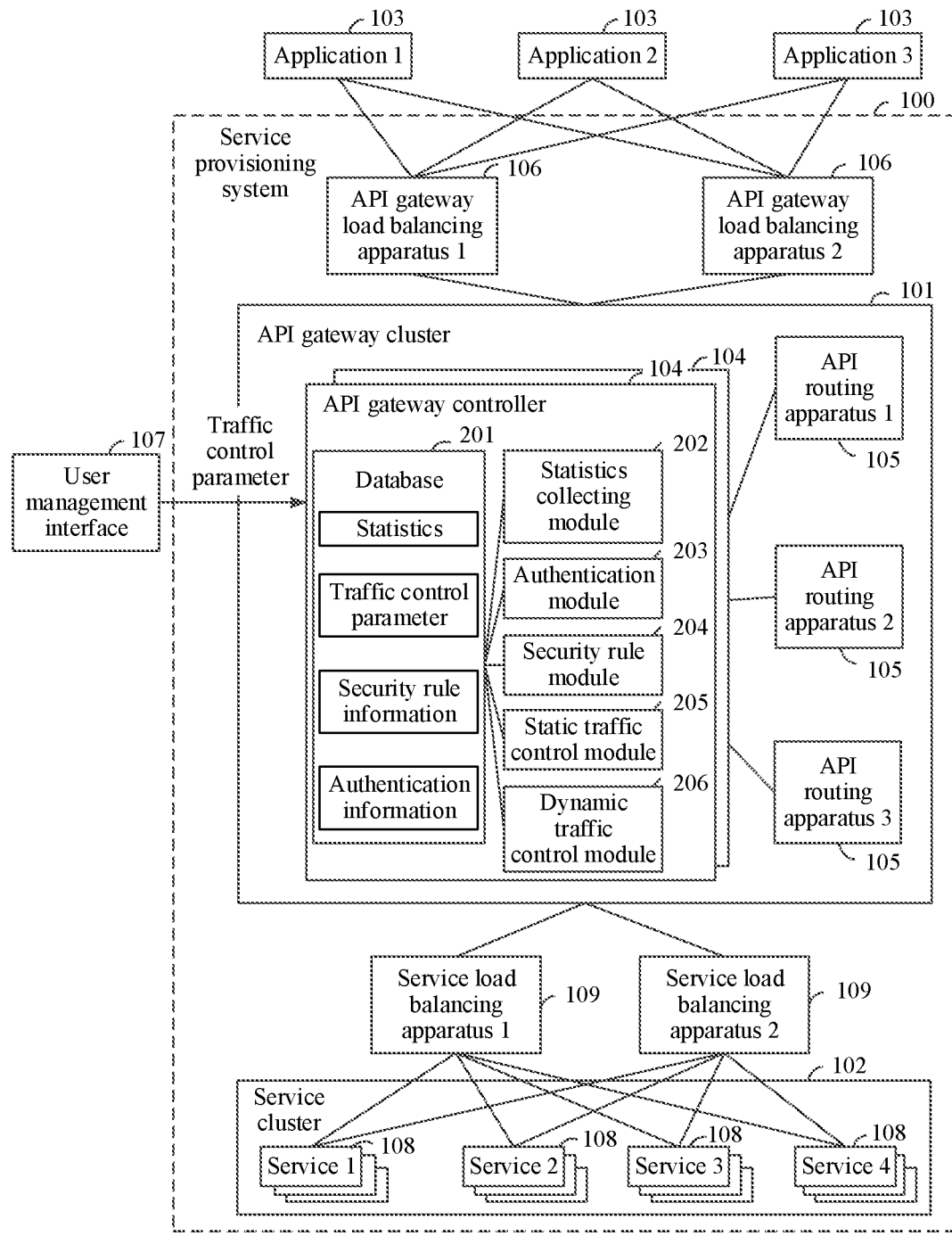
FIG. 2 is a schematic architectural diagram of another service provisioning system according to an embodiment of the present disclosure.

FIG. 2 is a schematic architectural diagram of another service provisioning system according to an embodiment of the present disclosure. To ensure stable running of an API gateway cluster 101, the API gateway cluster 101 may include at least two API gateway controllers 104.

At least one API gateway load balancing apparatus 106 may be disposed between applications 103 and the API gateway cluster 101. The API gateway load balancing apparatus 106 is configured to evenly allocate received API requests to API routing apparatuses 105, to implement load balancing between the API routing apparatuses 105.

Each API gateway controller 104 is provided with a database 201, and databases 201 of different API gateway controllers 104 keep synchronous, to ensure that the API gateway controllers 104 can collaboratively process the API requests. Alternatively, the API gateway controllers 104 in the API gateway cluster 101 share a database 201, the shared database 201 is disposed independent of any API gateway controller 104, and each API gateway controller 104 accesses/rewrites the shared database 201 when running, to ensure synchronization of various parameters and information that are used when the API gateway controllers 104 run.

A user may configure a traffic control parameter for the API gateway cluster 101 using a user management interface 107. The traffic control parameter is stored in the database 201. The traffic control parameter includes a user-level traffic control parameter and/or an API-request-level traffic control parameter.

The user-level traffic control parameter is set based on a user granularity. For example, the user-level traffic control parameter is an upper limit of a total quantity of API requests, of various types, that are sent by a user per unit of time and that can be processed by the API gateway cluster 101. The API requests of various types herein may be all API requests or some API requests sent by the user.

For example, user 1-per minute-5000 indicates that the API gateway cluster 101 processes, per minute, a maximum of 5000 API requests sent by the user 1.

For another example, user 1-API request 1, API request 2-per minute-4000 indicates that the API gateway cluster 101 processes, per minute, a maximum of 4000 API requests 1 and 2 that are sent by the user 1.

For another example, user-per minute-3000 indicates that the API gateway cluster 101 processes, per minute, a maximum of 3000 API requests sent by a user, and the user may be any user that accesses the service provisioning system 100.

The API-level traffic control parameter is set based on an API granularity. For example, the API-level traffic control parameter is an upper limit of a quantity of API requests, of a specific type, that are sent by a single user per unit of time and that can be processed by the API gateway cluster 101. Alternatively, the API-level traffic control parameter is an upper limit of a total quantity of API requests, of a specific type, that are sent by a plurality of users per unit of time and that can be processed by the API gateway cluster 101. The plurality of users herein may be all users or some users that access the service provisioning system 100.

For example, API request 1-single user-per minute-5000 indicates that the API gateway cluster 101 processes, per minute, a maximum of 5000 API requests 1 sent by the single user.

For another example, API request 1-per minute-4000 indicates that the API gateway cluster 101 processes, per minute, a maximum of 4000 API requests 1 sent by any user, and the any user may be any one or more of all users that access the service provisioning system 100.

The foregoing per unit of time may be set to per minute, per hour, per day, or another time granularity.

A service cluster 102 provides various types of services for the application 103 using the API gateway cluster 101. The service cluster 102 includes at least one service 108, and a plurality of services having a same function may be services of a specific type. For example, a service 1 is a service of one type, and a service 2 is a service of another type. Each type of service may include a plurality of services to balance workload.

The service 108 provides various functions for the user. A cloud service is used as an example, and the service 108 may be a service of the infrastructure as a service (IaaS) model, for example, a virtual machine creation service or a container creation service. Alternatively, the service may be a service of the platform as a service (PaaS) model, for example, a development environment deployment service. The service 108 may alternatively be a service of the software as a service (SaaS) model, for example, an office software service such as Microsoft® Office 365. The service 108 is run in the service cluster 102, and the service cluster 102 may be specifically a physical computer, a virtual machine, or a container. The service 108 provides a function for the user using a software module running on the physical computer, the virtual machine, or the container, and the software module is, for example, an application. A same type of service may be deployed on different physical computers in a distributed manner, or deployed on virtual machines or containers running on the different physical computers, to improve a redundancy capability of the service cluster 102.

The service 108 receives an API request forwarded by the API gateway cluster 101, and performs a corresponding action based on the API request. At least one service load balancing apparatus 109 is disposed between the service cluster 102 and the API gateway cluster 101. The service load balancing apparatus 109 evenly allocates API requests whose objectives are a same type of service to each service of the type of service, to implement load balancing between services of the type of service.

The API gateway controller 104, the API routing apparatus 105, the API gateway load balancing apparatus 106, the service 108, and the service load balancing apparatus 109 may perform interface communication with each other using a Hypertext Transfer Protocol Secure (HTTPS).

The API gateway controller 104 includes the database 201, a statistics collecting module 202, an authentication module 203, a security rule module 204, a static traffic control module 205, and a dynamic traffic control module 206. Any two or more of the foregoing modules may be combined into one module.

The database 201 stores security rule information, authentication information, the traffic control parameter, and statistics. The security rule information includes a security rule set for a specific user and/or a specific internet protocol (IP) address. The authentication information includes information about a validly registered user, and is used to authenticate an API request sent by the user. The statistics include information about an API published on the API gateway cluster 101 by each service 108 in the service cluster 102, such as an API identifier, and statistics of each API request, such as types and a quantity of API requests processed by the API gateway cluster 101 and efficiency of processing the API request by the API gateway cluster 101.

The statistics collecting module 202 is configured to collect statistics on and record information carried in an API request, such as an API identifier and a user identifier, and store the statistics into the database 201. For example, the statistics include a quantity of API requests 1 processed by the API gateway cluster 101 per unit of time, users that respectively send the API requests 1, and a quantity of API requests sent by a user 1 and processed by the API gateway cluster 101 per unit of time. The statistics collecting module 202 determines, using user identifiers carried in the API requests, a quantity of API requests sent by different users, and determines a quantity of different received API requests based on API identifiers carried in the API requests.

The authentication module 203 is configured to, when the API routing apparatus 105 receives an API request, authenticate an identity of a user that sends the API request, determine whether the user that sends the API request is a validly registered user, and when the user is invalid, generate a rejection response for the API request, and send, using the API routing apparatus 105, the rejection response to an application 103 that sends the API request. When performing user authentication, the authentication module 203 invokes the authentication information stored in the database 201, to determine whether the information about the validly registered user in the database 201 includes the user that sends the API request. If the validly registered authentication information does not include the user that sends the API request, the authentication module 203 determines that the API request is invalid.

The security rule module 204 is configured to invoke the security rule information stored in the database 201, to determine whether the user that sends the API request is a specific user or whether an IP address of the application 103 that sends the API request is a specific IP address, and if the user that sends the API request is the specific user or the IP address of the application 103 that sends the API request is the specific IP address, process the API request based on a corresponding security rule.

The static traffic control module 205 is configured to determine, based on the traffic control parameter and the statistics, whether to perform traffic control. When the static traffic control module 205 determines that a quantity of API requests sent by a specific user per unit of time exceeds a user-level traffic control parameter corresponding to the user, the static traffic control module 205 performs traffic control, in an embodiment, generates a rejection response, and sends the rejection response to an application 103 of the user using the API routing apparatus 105. When determining that a quantity of API requests, of a specific type, processed per unit of time exceeds an API-request-level traffic control parameter corresponding to the API requests, the static traffic control module 205 generates a rejection response, and sends, using the API routing apparatus 105, the rejection response to an application 103 that sends the API requests.

By setting the traffic control parameter, traffic control is performed on the API request sent by the user, to avoid that an excessive large quantity of API requests may exceed a processing capability of the API gateway cluster 101 or the service cluster 102 and working efficiency and even stability of the service provisioning system 100 are affected, and stable running of the API gateway cluster 101 is ensured.

During actual running, actual processing capabilities of the API gateway cluster 101 and the service cluster 102 change frequently. If traffic is controlled using only the static traffic control module 205, control precision is relatively low, and working efficiency of the service cluster 102 is affected. To avoid this problem, the API gateway controller 104 provided in this embodiment of the present disclosure further includes a dynamic traffic control module 206.

The dynamic traffic control module 206 is configured to, when the static traffic control module 205 detects that traffic control needs to be performed, determine, based on load parameters of the API routing apparatus 105 and the service cluster 102, whether the API routing apparatus 105 and the service cluster 102 are congested, and determine a corresponding traffic control manner based on congestion statuses of the API routing apparatus 105 and the service cluster 102. For example, when the API routing apparatus 105 is congested, the dynamic traffic control module 206 instructs to add a new API routing apparatus 105 into the API gateway cluster 101, to relieve congestion of the API routing apparatus 105. When the service cluster 102 is congested, the dynamic traffic control module 206 sets a blacklist, and the API routing apparatus 105 rejects an API request based on the blacklist. The dynamic traffic control module 206 may further modify the traffic control parameter when neither the API gateway cluster nor the service cluster is congested. In addition, when determining that the API routing apparatus 105 is not congested, the dynamic traffic control module 206 may further instruct to delete an API routing apparatus 105 from the API gateway cluster 101, to improve utilization of the API gateway cluster.

The dynamic traffic control module 206 sets the blacklist in the API gateway cluster 101 based on a load status of the API routing apparatus 105 and/or a load status of the service cluster 102 in the API gateway cluster 101, and scales out or scales in the API routing apparatus 105, or adjusts the traffic control parameter, to implement more refined traffic control and improve the working efficiency and stability of the service cluster 102.

Services, modules, databases, and apparatuses in the service cluster 102 may be separately deployed on different physical machines, virtual machines, or containers, or may be randomly combined and deployed on a same physical machine, virtual machine, or container. Each apparatus, service, or database may be one instance. The service provisioning system 100 stores different types of operating system images, and one type of operating system image is used to establish one type of instance.

With reference to FIG. 1 and FIG. 2, the following describes an API gateway cluster control method provided in an embodiment of the present disclosure.

Figure 3A:
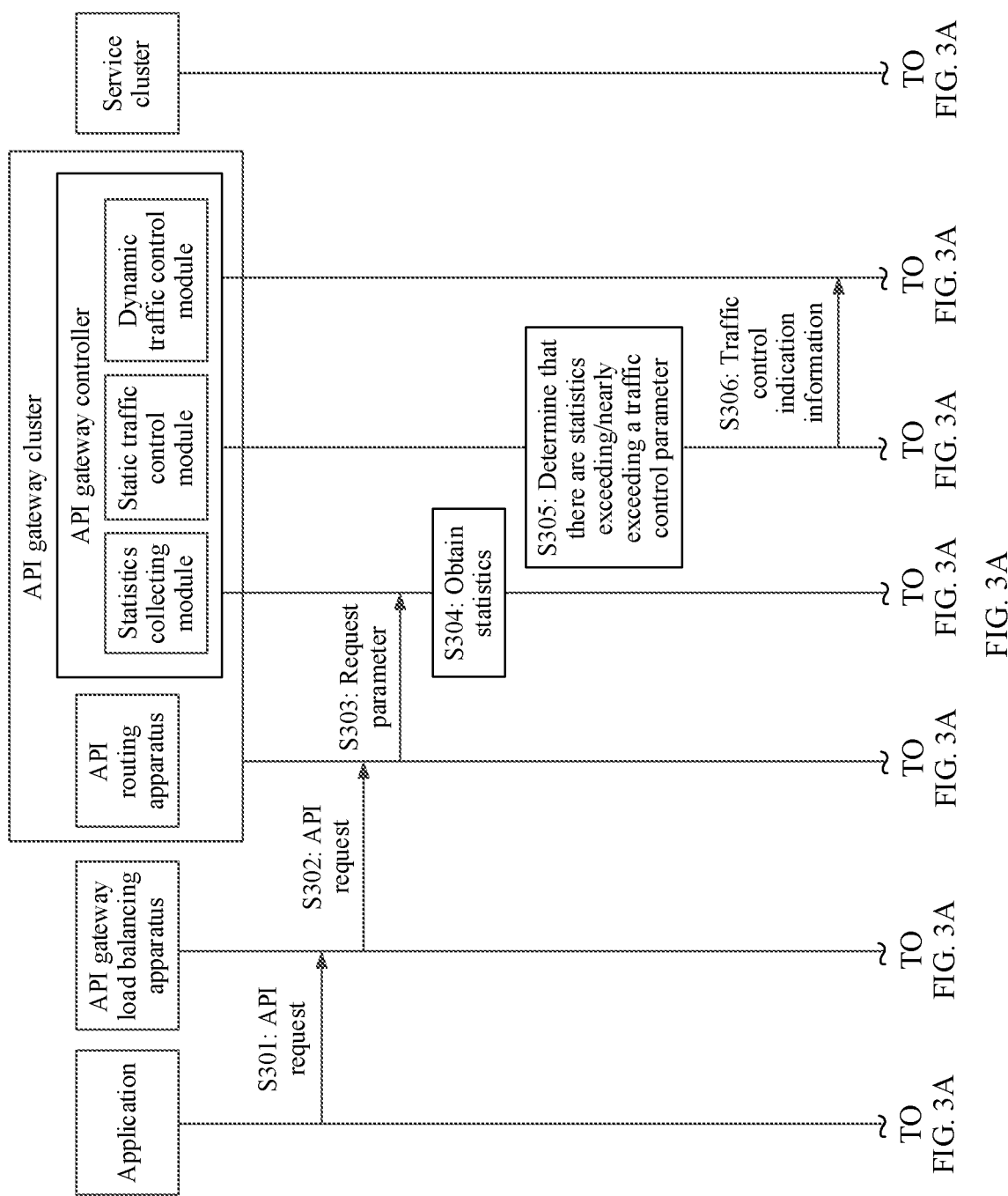
FIG. 3A to FIG. 3C are a schematic flowchart of an API gateway cluster control method according to an embodiment of the present disclosure.
Figure 3B:
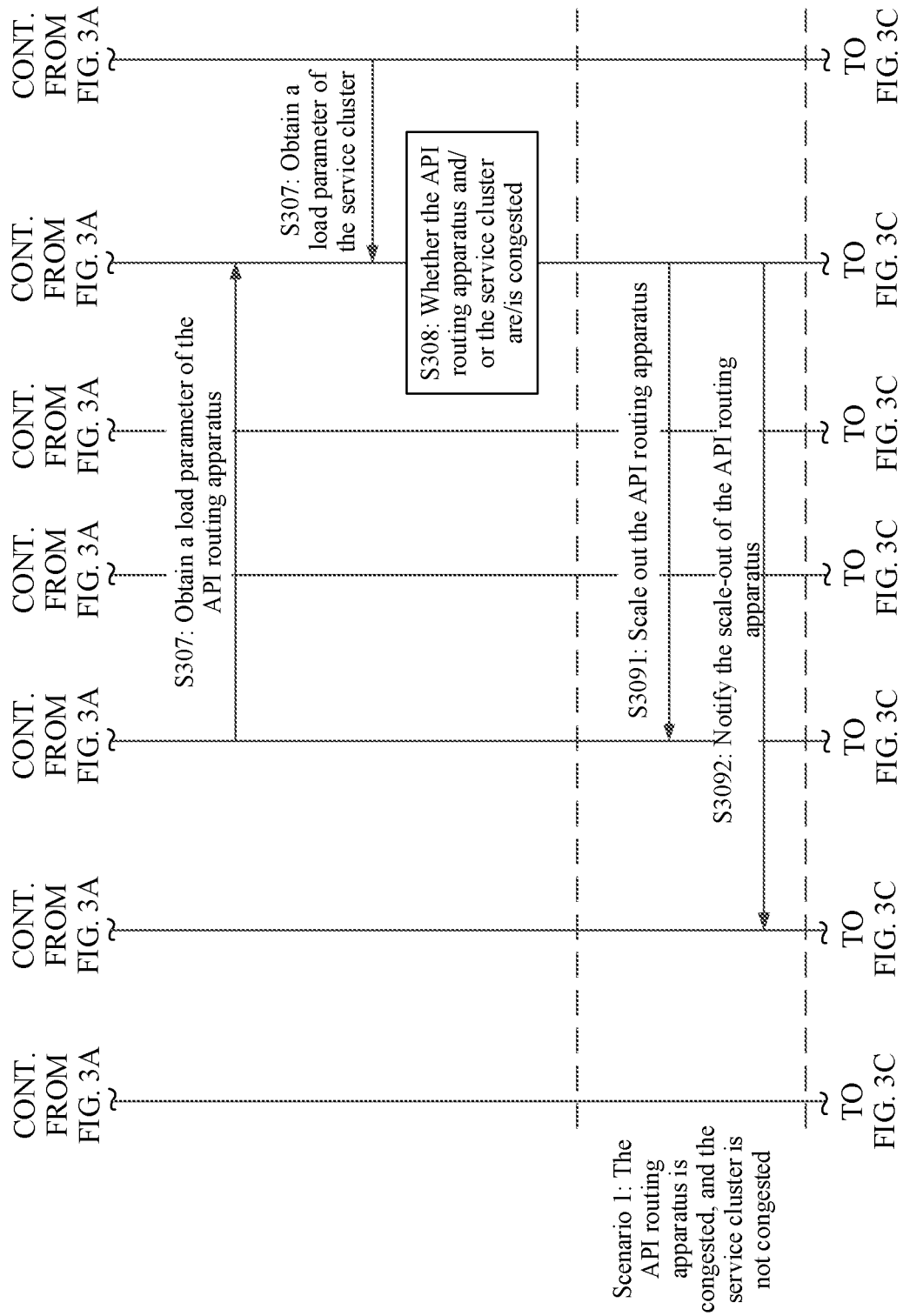
Figure 3C:
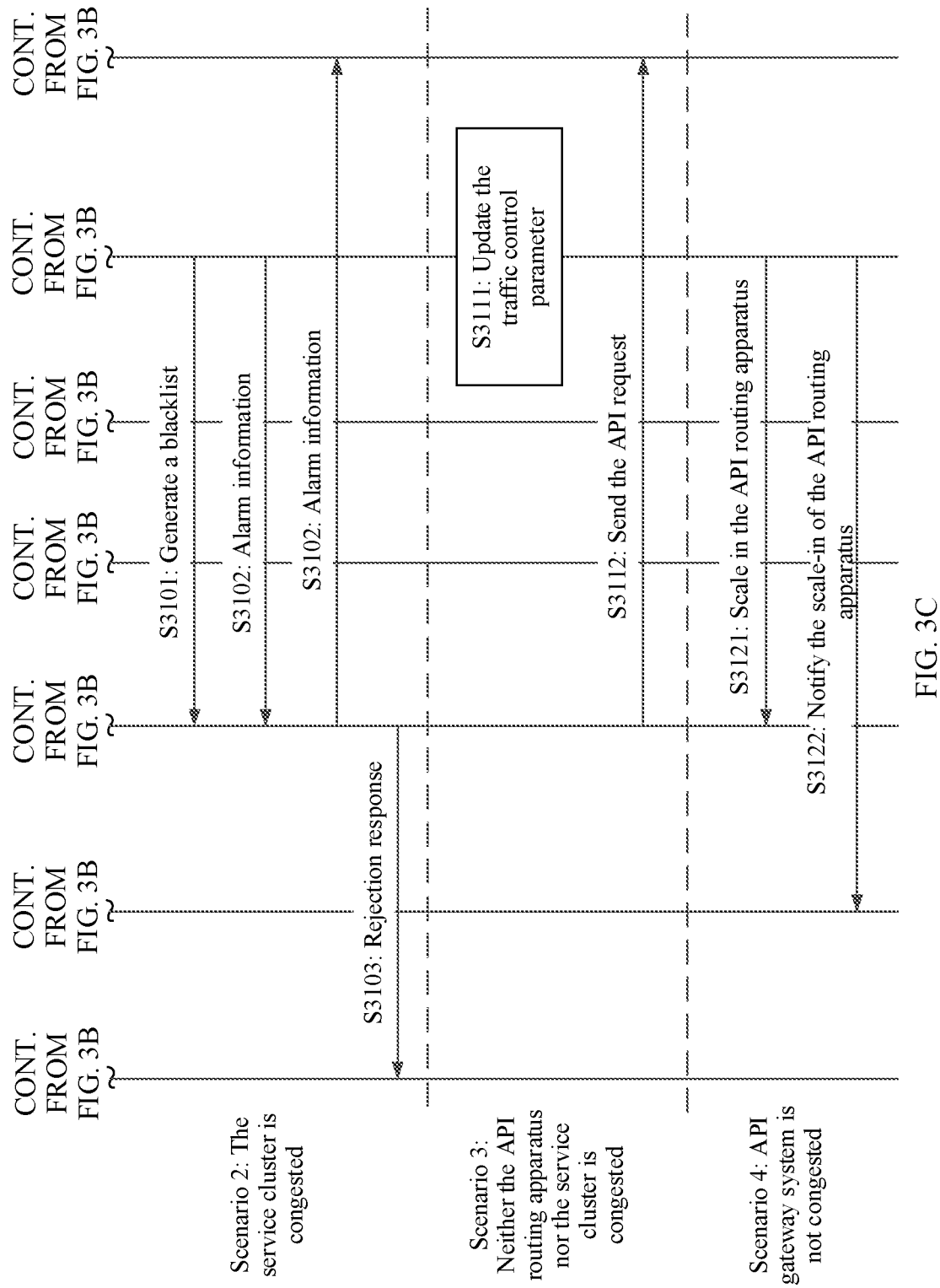

FIG. 3A to FIG. 3C are a schematic flowchart of an API gateway cluster control method according to an embodiment of the present disclosure. The method may be applied to the API gateway cluster 101 shown in FIG. 1 or FIG. 2, and includes the following steps.

S301. An application 103 sends an API request to an API gateway load balancing apparatus 106.

S302. The API gateway load balancing apparatus 106 sends the API request to an API routing apparatus 105.

The application 103 sends the API request to the API gateway load balancing apparatus 106. The API gateway load balancing apparatus 106 performs load balancing on the received API request, and distributes the API request to different API routing apparatuses 105.

S303. The API routing apparatus 105 sends, to an API gateway controller 104, a request parameter carried in the API request.

The API routing apparatus 105 may extract the request parameter carried in the API request, and send the request parameter to the API gateway controller 104. The API routing apparatus 105 may alternatively send the entire API request to the API gateway controller 104, and the API gateway controller 104 extracts the request parameter.

In S303, after obtaining the request parameter, the API gateway controller 104 first filters the request parameter of the API request using an authentication module 203 and a security rule module 204. If the API request cannot be authenticated or cannot match a security rule, the API gateway controller 104 generates a rejection response, and sends the rejection response to the application 103 using the API routing apparatus 105. The procedure ends. If the API request can be authenticated and can match the security rule, the following steps continue to be performed.

S304. A statistics collecting module 202 collects statistics on the request parameter based on a traffic control parameter, and stores statistics obtained through statistics collection into a database 201. Specifically, statistics may be collected at an API request granularity and/or a user granularity. For details of a statistical dimension, refer to a design of the traffic control parameter. For example, the statistical dimension is user 1-statistical quantity in a current unit of time, API request 1-statistical quantity in a current unit of time, API request 1-user 1-statistical quantity in a current unit of time, or API request 1-user 2-statistical quantity in a current unit of time.

The first line is used to count a quantity of API requests sent by the user 1 in the current unit of time (for example, the last one minute), and is specific to a user-level traffic control parameter.

The second line is used to count a quantity of API requests 1 sent by all users in the current unit of time, and is specific to an API-request-level traffic control parameter.

The third and fourth lines are used to count a quantity of API requests 1 sent by each user in the current unit of time, and are specific to an API-request-level traffic control parameter.

S305. A static traffic control module 205 determines, based on the statistics and the traffic control parameter, that there are statistics exceeding or nearly exceeding the traffic control parameter.

S306. The static traffic control module 205 generates traffic control indication information, and sends the traffic control indication information to a dynamic traffic control module 206.

The static traffic control module 205 obtains the traffic control parameter and statistical parameter from the database 201, and compares the two parameters. When a plurality of levels of or a plurality of traffic control parameters are set, the traffic control parameters are separately compared with the statistical parameter. When determining that a quantity of API requests sent by one or more users exceeds or nearly exceeds a user-level traffic control parameter set for the user, or determining that a quantity of API requests, of one or more types, received by the API gateway cluster 101 exceeds or nearly exceeds an API-request-level traffic control parameter, the static traffic control module 205 generates the traffic control indication information, and sends the traffic control indication information to the dynamic traffic control module 206.

For example, the statistical parameters are as follows User 1-5980, API request 1-4003, API request 1-user 1-1800, and API request 1-user 2-500.

The traffic control parameters are as follows User 1-6000, API request 1-per minute-4000, and API request 1-user-1700.

It can be learned that both the second traffic control parameter and the third traffic control parameter are exceeded, and the first traffic control parameter is nearly exceeded. Therefore, the static traffic control module 205 generates the traffic control indication information. Because the traffic control indication information takes a period of time to take effect, to prevent the traffic control parameter from being further exceeded, the static traffic control module 205 may generate the traffic control indication information when the traffic control parameter is nearly exceeded.

S307. The dynamic traffic control module 206 obtains a load parameter of a service cluster 102, and obtains a load parameter of the API routing apparatus 105.

A sequence of obtaining the two load parameters may be changed. S307 may not be performed after S306, and the dynamic traffic control module 206 may periodically collect the load parameter of the service cluster 102 and the load parameter of the API routing apparatus 105. The load parameter may be at least one of processor usage, memory usage, a network inbound/outbound rate, or bandwidth usage of a virtual machine, a container, or a physical computer.

S308. The dynamic traffic control module 206 respectively compares the load parameter of the service cluster 102 and the load parameter of the API routing apparatus 105 with a preset first threshold and a preset second threshold, to determine whether the service cluster 102 is congested and whether the API routing apparatus 105 is congested. When the load parameter of the service cluster 102 exceeds the first threshold, it is determined that the service cluster 102 is congested. When the load parameter of the API routing apparatus 105 exceeds the second threshold, it is determined that the API routing apparatus 105 is congested. Alternatively, the first threshold and the second threshold may be a same threshold.

An execution sequence of S307 and S308 may be flexibly designed. A load parameter may be first obtained, to determine whether a cluster/apparatus is congested, and then the other load parameter is obtained, to determine whether the other cluster/apparatus is congested. It is unnecessary to first collect the two load parameters, and then determine whether the service cluster 102 and the API routing apparatus 105 are congested. For example, after the load parameter of the service cluster 102 is obtained, it may be determined whether the service cluster 102 is congested, and then the load parameter of the API routing apparatus 105 is obtained, and it is determined whether the API routing apparatus 105 is congested.

If in S305, when the static traffic control module 205 determines that statistics of a specific type of API request exceeds the API-request-level traffic control parameter, the dynamic traffic control module 206 may obtain a load parameter of a target service of the API request, and determine whether the service cluster 102 is congested by determining whether the load parameter of the target service exceeds the first threshold. When the API-request-level traffic control parameter is exceeded, only one target service (one type of service) of the API request may be congested, and another type of service is not congested. In this scenario, the load parameter of the target service of the API request is obtained, and a congestion status of the current service cluster 102 can be more accurately represented.

According to a determining result of the dynamic traffic control module 206 in S308, the following four scenarios may occur. The four scenarios are not mutually exclusive, and two or more scenarios may occur at the same time. In this case, the scenarios may be executed in parallel or in sequence.

Scenario 1. The dynamic traffic control module 206 determines that the API routing apparatus 105 is congested and the service cluster 102 is not congested.

In this scenario, a processing capability of the service cluster 102 is not fully used, and that the API routing apparatus 105 is congested indicates that a quantity of API requests received by the API gateway cluster 101 is excessively large and exceeds a processing capability of the API gateway cluster 101. Therefore, a resource waste of the service cluster 102 is caused. To avoid the resource waste of the service cluster 102, the API gateway controller 104 scales out the API routing apparatus 105 in the API gateway cluster 101, in other words, establishes a new API routing apparatus 105. Because the new API routing apparatus is added to the API gateway cluster 101, the newly added API routing apparatus 105 may reduce load of another API routing apparatus 105 such that the processing capability of the API gateway cluster 101 is improved, the processing capability of the API gateway cluster 101 matches the processing capability of the service cluster 102, and the resource waste of the service cluster 102 is avoided.

The following steps are further included.

S3091. The API gateway controller 104 scales out the API routing apparatus 105.

The API gateway controller 104 generates a scale-out instruction, establishes a new API routing apparatus 105 based on the scale-out instruction, and adds the newly established API routing apparatus 105 to an original API routing apparatus 105 cluster for joint management. The API gateway controller 104 may send the scale-out instruction to a management plane of a service provisioning system, and the management plane assigns a new physical computer/virtual machine/container, obtains an operating system image corresponding to the API routing apparatus 105, and establishes the new API routing apparatus 105 on the assigned physical computer/virtual machine/container.

S3092. The dynamic traffic control module sends a scale-out notification message to the API gateway load balancing apparatus 106.

The API gateway controller 104 notifies the API gateway load balancing apparatus 106 of the establishment of the new API routing apparatus 105. For example, address information of the newly established API routing apparatus 105 may be carried in the scale-out notification message, and the scale-out notification information is sent to the API gateway load balancing apparatus 106 such that the API gateway load balancing apparatus 106 adds the address information of the newly established API routing apparatus 105 to a load balancing table. API requests received by the API gateway load balancing apparatus 106 are evenly allocated to each API routing apparatus 105 in the load balancing table.

Scenario 2. The dynamic traffic control module 206 determines that the service cluster 102 is congested.

In this scenario, to avoid a security risk that may be caused when the service cluster 102 is congested, the dynamic traffic control module 206 generates a blacklist, and the API routing apparatus 105 rejects some corresponding API requests based on the blacklist such that load of the service cluster 102 is reduced and security of the service cluster 102 is improved.

S3101. The dynamic traffic control module 206 generates a blacklist and sends the blacklist to the API routing apparatus 105.

The blacklist generated by the dynamic traffic control module 206 includes a user-level blacklist and/or an API-request-level blacklist. Each piece of information in the user-level blacklist includes a user identifier and a validity period. Each piece of information in the API-request-level blacklist includes an API identifier and a validity period. The validity period indicates a time period when each piece of information exists in the blacklist.

If the static traffic control module 205 determines that a quantity of API requests received by the API gateway cluster 101 and sent by a specific user exceeds a user-level traffic control parameter set for the user, a user identifier of the user is added to the traffic control indication information, and the dynamic traffic control module 206 adds the user identifier of the user to the user-level blacklist.

If the static traffic control module 205 determines that a quantity of API requests, of a specific type, received by the API gateway cluster 101 exceeds an API-request-level traffic control parameter, an API identifier of the API request is carried in the traffic control indication information, and the dynamic traffic control module 206 adds the API identifier to the API-request-level blacklist.

S3102. The dynamic traffic control module 206 generates alarm information, and sends the alarm information to the service cluster 102 using the API routing apparatus 105. The alarm information indicates that the processing capability of the service cluster 102 is insufficient.

The service cluster 102 may be scaled out based on the alarm information.

S3103. The API routing apparatus 105 sends a rejection response to the application 103.

The API routing apparatus 105 rejects processing an API request sent by a user in the user-level blacklist, generates a rejection response, and sends the rejection response to an application 103 that sends the API request. Alternatively, the API routing apparatus 105 rejects processing an API request in the API-request-level blacklist, generates a rejection response, and sends the rejection response to an application 103 that sends the API request.

Scenario 3. The dynamic traffic control module 206 determines that neither the API routing apparatus 105 nor the service cluster 102 is congested.

When neither the service cluster 102 nor the API gateway cluster 101 is congested, resource wastes exist in processing capabilities of both the API gateway cluster 101 and the service cluster 102. This indicates that an existing traffic control parameter is set improperly.

S3111. The dynamic traffic control module 206 updates the traffic control parameter. The updated traffic control parameter is stored in the database 201, to replace the original traffic control parameter.

The dynamic traffic control module 206 may obtain the new traffic control parameter based on the load parameter of the API gateway cluster 101 and the load parameter of the service cluster 102, and update the original traffic control parameter using the new traffic control parameter. Alternatively, the dynamic traffic control module 206 increases the original traffic control parameter by a preset proportion, to obtain the new traffic control parameter. Alternatively, the dynamic traffic control module 206 uses a sum of values of a preset parameter and the original traffic control parameter as the new traffic control parameter.

A value of the new traffic control parameter is greater than a value of the original preset traffic control parameter such that more API requests can be forwarded to the service cluster 102 using the API gateway cluster 101, and the resource waste of the service cluster 102 is avoided.

S3112. The API routing apparatus 105 sends the API request to the service cluster 102.

After the traffic control parameter is updated, there is no statistics exceeding/nearly exceeding the traffic control parameter, the API gateway cluster 101 no longer rejects the API request, and the API routing apparatus sends the API request to the service cluster 102.

Scenario 4. The dynamic traffic control module 206 determines that the API routing apparatus 105 is not congested.

When the API gateway cluster 101 is not congested, a resource waste exists in the processing capability of the API gateway cluster 101.

S3121. The API gateway controller 104 scales in the API routing apparatus 105.

The API gateway controller 104 deletes a specific quantity of API routing apparatuses 105.

S3122. The dynamic traffic control module sends a scale-in notification message to the API gateway load balancing system.

The API gateway controller 104 notifies the API gateway load balancing apparatus 106 of deletion of an API routing apparatus 105. For example, address information of a deleted API routing apparatus 105 may be carried in the scale-in notification message, and the scale-in notification message is sent to the API gateway load balancing apparatus 106 such that the API gateway load balancing apparatus 106 deletes the address information of the deleted API routing apparatus 105 from the load balancing table, and energy consumption of the service provisioning system 100 is reduced.

The foregoing four scenarios may be executed in parallel. For example, scenario 2 and scenario 4 may be executed in parallel, or scenario 3 and scenario 4 may be executed in parallel. The foregoing four scenarios may alternatively be serially executed in a specific sequence. For example, after the scenario 1 is executed, neither the API routing apparatus 105 nor the service cluster 102 is congested, and the service provisioning system 100 may execute the scenario 3. For another example, after a period of time after the scenario 2 is executed, neither the API routing apparatus 105 nor the service cluster 102 is congested, and the service provisioning system 100 may execute the scenario 3.

Figure 4:
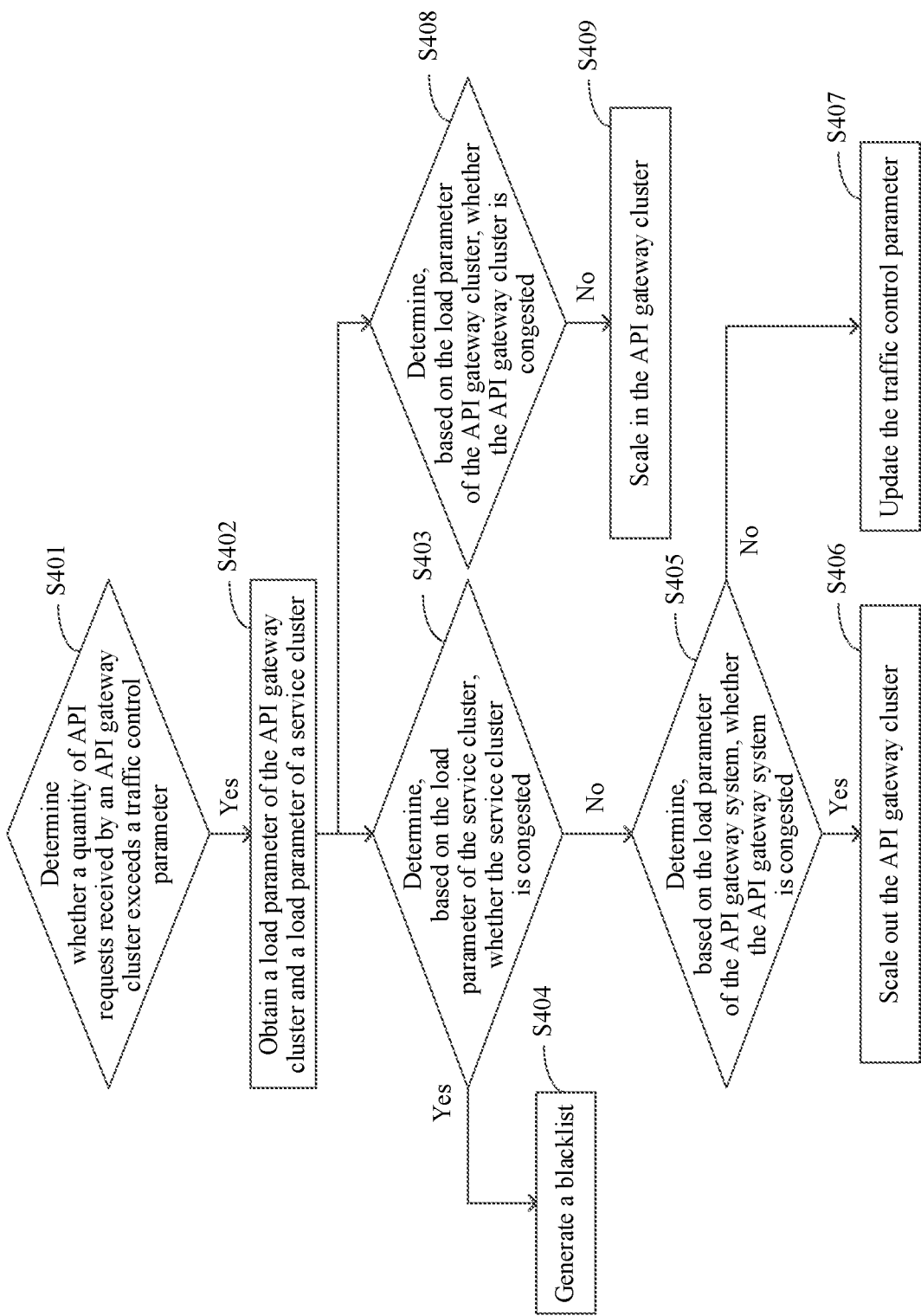
FIG. 4 is a schematic flowchart of another API gateway cluster control method according to an embodiment of the present disclosure.

FIG. 4 is a schematic flowchart of another API gateway cluster control method according to an embodiment of the present disclosure. The method may also be applied to the API gateway cluster shown in FIG. 1 and FIG. 2. For implementation details of the method, refer to the method shown in FIG. 3A to FIG. 3C. The method includes the following steps.

S401. An API gateway controller determines whether a quantity of API requests received by the API gateway cluster exceeds a traffic control parameter, and if the quantity of the API requests received by the API gateway cluster exceeds the traffic control parameter, S402 is performed.

S402. The API gateway controller obtains a load parameter of the API gateway cluster and a load parameter of a service cluster.

The load parameter of the API gateway cluster includes a load parameter of an API routing apparatus.

S403. The API gateway controller determines, based on the load parameter of the service cluster, whether the service cluster is congested, and if the service cluster is congested, S404 is performed, or if the service cluster is not congested, S405 is performed.

S404. The API gateway controller generates a blacklist, and sends the blacklist to the API routing apparatus.

S405. The API gateway controller determines, based on the load parameter of the API gateway cluster, whether the API gateway cluster is congested, and if the API gateway cluster is congested, S406 is performed, or if the API gateway cluster is not congested, S407 is performed.

For example, whether the API gateway cluster is congested is determined depending on whether a load parameter of a virtual machine, a container, or a physical computer on which each API routing apparatus in the API gateway cluster is located is greater than a preset threshold. If the load parameter is greater than the preset threshold, it is determined that the API gateway cluster is congested, and S406 is performed. If the load parameter is equal to or less than the preset threshold, it is determined that the API gateway cluster is not congested, and S407 is performed.

S406. Scale out the API gateway cluster, in other words, add an API routing apparatus to the API gateway cluster.

S407. Update the traffic control parameter.

Optionally, after S402, the method further includes the following steps.

S408 Determine, based on the load parameter of the API gateway cluster, whether the API gateway cluster is congested, and if the API gateway cluster is not congested, S409 is performed, or if the API gateway cluster is congested, a step of determining, based on the load parameter of the service cluster, whether the service cluster is congested (for example, S403) is performed. If the service cluster is congested, a blacklist is generated (for example, S404). If the service cluster is not congested, the API gateway cluster is scaled out (for example, S406).

S409. Scale in the API gateway cluster, in other words, delete an API routing apparatus from the API gateway cluster.

Figure 5:
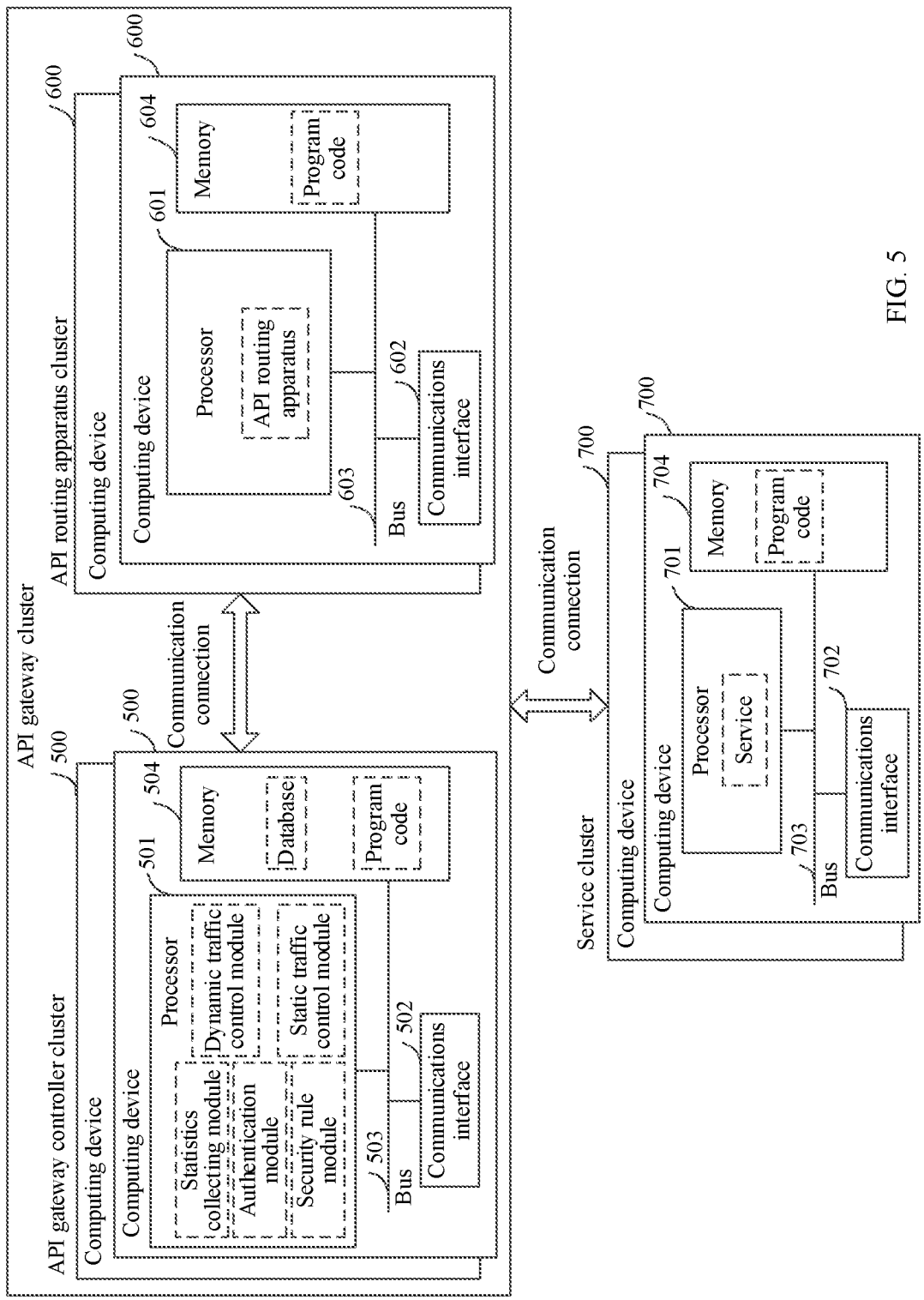
FIG. 5 is a schematic structural diagram of a service provisioning system according to an embodiment of the present disclosure.

FIG. 5 is a schematic structural diagram of a service provisioning system according to an embodiment of the present disclosure. The service provisioning system includes an API gateway cluster and a service cluster, and a communication connection is established between the API gateway cluster and service cluster. The API gateway cluster includes an API gateway controller cluster and an API routing apparatus cluster, and a communication connection is established between the API gateway controller cluster and the API routing apparatus cluster.

The API gateway controller cluster includes one or more computing devices 500. The API routing apparatus cluster includes one or more computing devices 600. The service cluster includes one or more computing devices 700.

Each computing device includes one or more processors, a communications interface, and a memory. The processor, the communications interface, and the memory may be connected using a bus. The processor may include one or more general-purpose processors, for example, a central processing unit (CPU). The memory may include a volatile memory, for example, a random-access memory (RAM), or the memory may include a non-volatile memory, for example, a read-only memory (ROM), a flash memory, a hard disk drive (HDD), or a solid-state drive (SSD), or the memory may include a combination of the foregoing types of memories. The communications interface may be a wired interface (for example, an Ethernet interface) or a wireless interface (for example, a cellular network interface or a wireless local area network interface), and is configured to communicate with another computing device.

A processor 501 of the computing device 500 is configured to run program code in a memory 504, to implement a statistics collecting module, a dynamic traffic control module, a static traffic control module, a security rule module, and an authentication module. The memory 504 further stores a database. Each computing device 500 in the API gateway controller cluster may run any one or more of the statistics collecting module, the dynamic traffic control module, the static traffic control module, the security rule module, the authentication module, and the database. For example, one or more virtual machines or containers may run on the computing device 500, and any one or more of the statistics collecting module, the dynamic traffic control module, the static traffic control module, the security rule module, the authentication module, and the database run on each virtual machine or container. Computing devices 500 in the API gateway controller cluster cooperate to complete a function of the API gateway controller 104.

A communications interface 502 is configured to communicate with the computing device 600 and the computing device 700, for example, receive a load parameter of the service cluster and a load parameter of the API routing apparatus that are sent by the computing device 600 and the computing device 700. The communications interface 502 further has a function of a user interface, and is configured to receive a traffic control parameter sent by a user management interface.

A processor 601 of the computing device 600 is configured to run program code in a memory 604, to implement the API routing apparatus. When there are a plurality of API routing apparatuses in the API gateway cluster, one or more API routing apparatuses may run on each computing device 600.

A communications interface 602 is configured to communicate with the computing device 500 and the computing device 700, for example, receive a blacklist and alarm information sent by the computing device 500, and send an API request to the computing device 700.

A processor 701 of the computing device 700 is configured to run program code in a memory 704, to implement various services. When the service cluster has a plurality of services, one or more services may run on each computing device 700.

A communications interface 702 is configured to communicate with the computing device 500 and the computing device 600, for example, send the load parameter of the service cluster to the computing device 500, and receive the API request sent by the computing device 600.

An API gateway load balancing apparatus and a service load balancing apparatus are omitted in FIG. 5. Actually, a computing device may be further disposed between the computing device 600 and an application, and is configured to run the API gateway load balancing apparatus. A computing device is disposed between the API gateway cluster and the service cluster, and is configured to run the service load balancing apparatus.

In FIG. 5, the API gateway controller cluster, the API routing apparatus cluster, and the service cluster are separately deployed. In practice, computing devices of the three clusters may also overlap. For example, on some computing devices in the service provisioning system, not only any one or more of the statistics collecting module, the dynamic traffic control module, the static traffic control module, the security rule module, the authentication module, and the database may run, but also one or more API routing apparatuses may run, or one or more services may run. The computing device in FIG. 5 may be provided by a cloud computing vendor. A user rents the computing device of the cloud computing vendor, deploys a service on the computing device, and rents an API gateway controller and various load balancing apparatuses that are deployed on the computing device.

It should be noted that the embodiments provided in this specification are merely examples. A person skilled in the art may clearly know that, for convenience and conciseness of description, in the foregoing embodiments, the embodiments emphasize different aspects, and for a part not described in detail in one embodiment, refer to related descriptions of another embodiment. The features disclosed in the embodiments of the present disclosure, claims, and the accompanying drawings may exist independently or exist in a combination. Features described in a hardware form in the embodiments of the present disclosure may be executed by software, and vice versa. This is not limited herein.

A person of ordinary skill in the art may be aware that, the methods and steps of the examples described in the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present disclosure.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present disclosure are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber) or wireless (for example, infrared, radio, or microwave) manner. The computer-readable storage medium may be any usable medium accessible by the computer, or a data storage device, such as a server or a data center, integrating one or more usable media. The usable medium may be various non-transitory machine-readable media that can store program code, such as a magnetic medium (for example, a floppy disk, a hard disk, or a magnetic tape), an optical medium (for example, a digital versatile disc (DVD)), a semiconductor medium (for example, a SSD), or the like.

What is claimed is:

1. An application programming interface (API) gateway cluster control method implemented by a service provisioning system, wherein the API gateway cluster control method comprises:

receiving, by an API gateway cluster in the service provisioning system, a quantity of API requests, wherein the API gateway cluster provides a plurality of applications with access to a service cluster in the service provisioning system, wherein the API gateway cluster comprises an API gateway controller and at least one API routing apparatus, wherein each of the API requests is sent from one of the applications and is forwarded to a target service by the API gateway cluster, and wherein the at least one API routing apparatus is implemented on at least one instance;

obtaining, by the API gateway cluster, a first load parameter of the API gateway cluster;

receiving, by the API gateway cluster, a scaling rule of the API gateway cluster, wherein the scaling rule comprises a first number of to-be-added instances and a scaling-out condition, and wherein the scaling-out condition comprises the first load parameter being greater than a first threshold;

determining, by the API gateway cluster, that the scaling-out condition is fulfilled; and scaling out, by the API gateway cluster in response to the scaling-out condition being fulfilled, the API gateway cluster by adding the at least one instance with the first number of to-be-added instances.

2. The API gateway cluster control method of claim 1, wherein the first load parameter indicates usage of resources of the API gateway cluster.

3. The API gateway cluster control method of claim 1, wherein the scaling rule further comprises a second number of to-be-deleted instances and a scaling-in condition, wherein the scaling-in condition comprises the first load parameter being lower than a second threshold, and wherein the API gateway cluster control method further comprises:

determining, by the API gateway cluster, that the scaling-in condition is fulfilled; and scaling in, by the API gateway cluster in response to the scaling-in condition being fulfilled, the API gateway cluster by deleting the at least one instance with the second number of to-be-deleted instances.

4. The API gateway cluster control method of claim 1, wherein before determining the scaling-out condition is fulfilled, the API gateway cluster control method further comprises obtaining, by the API gateway cluster, a second load parameter of the service cluster, and wherein the scaling-out condition further comprises the second load parameter being lower than a second threshold.

5. The API gateway cluster control method of claim 1, further comprising determining, by the API gateway cluster, that the quantity of API requests exceeds a traffic control parameter.

6. The API gateway cluster control method of claim 1, wherein the first load parameter comprises a second load parameter of the at least one API routing apparatus.

7. The API gateway cluster control method of claim 1, wherein the first load parameter is obtained based on an amount of API requests.

8. An application programming interface (API) gateway cluster comprising at least one computing device, wherein each of the at least one computing device comprises:

a processor; and a memory coupled to the processor and configured to store instructions that, when executed by the processor, cause the API gateway cluster to be configured to:

receive a quantity of API requests from a plurality of applications, wherein the API gateway cluster comprises an API gateway controller and at least one API routing apparatus, wherein each of the API requests is forwarded to a target service by the API gateway cluster, and wherein the at least one API routing apparatus is implemented on at least one instance;

obtain a first load parameter of the API gateway cluster;

receive a scaling rule of the API gateway cluster, wherein the scaling rule comprises a first number of to-be-added instances and a scaling-out condition, and wherein the scaling-out condition comprises the first load parameter being greater than a first threshold;

determine that the scaling-out condition is fulfilled; and scale out, in response to the scaling-out condition being fulfilled, the API gateway cluster by adding the at least one instance with the first number of to-be-added instances.

9. The API gateway cluster of claim 8, wherein the first load parameter indicates usage of resources of the API gateway cluster.

10. The API gateway cluster of claim 8, wherein the scaling rule further comprises a second number of to-be-deleted instances and a scaling-in condition, wherein the scaling-in condition comprises the first load parameter being lower than a second threshold, and wherein the API gateway cluster is further configured to:

determine that the scaling-in condition is fulfilled; and scale in, in response to the scaling-in condition being fulfilled, the API gateway cluster by deleting the at least one instance with the second number of to-be-deleted instances.

11. The API gateway cluster of claim 8, wherein before determining that the scaling-out condition is fulfilled, the API gateway cluster is further configured to obtain a second load parameter of a service cluster, and wherein the scaling-out condition further comprises the second load parameter being lower than a second threshold.

12. The API gateway cluster of claim 8, wherein the API gateway cluster is further configured to determine that the quantity of API requests exceeds a traffic control parameter.

13. The API gateway cluster of claim 8, wherein the first load parameter comprises a second load parameter of the at least one API routing apparatus.

14. The API gateway cluster of claim 8, wherein the first load parameter is obtained based on an amount of API requests.

15. An application programming interface (API) gateway cluster control method implemented by a service provisioning system, wherein the API gateway cluster control method comprises:

obtaining, by an API gateway cluster in the service provisioning system, load parameter of the service provisioning system, wherein the API gateway cluster provides a plurality of applications with access to the service cluster in the service provisioning system, wherein the API gateway cluster comprises an API gateway controller and at least one API routing apparatus, wherein each of the API requests is forwarded to a target service by the API gateway cluster, and wherein the at least one API routing apparatus is implemented on at least one instance, and wherein the load parameter of the service provisioning system comprising load status of a service cluster in the service provisioning system or load parameter of the API gateway cluster; and adjusting, by the API gateway cluster in the service provisioning system, a traffic control parameter based on the load parameter of the service provisioning system.

16. The API gateway cluster control method of claim 15, wherein the traffic control parameter includes a user-level traffic control parameter and/or an API-request-level traffic control parameter.

17. The API gateway cluster control method of claim 15, wherein the load status includes at least one of processor usage, memory usage, a network inbound/outbound rate, or bandwidth usage of a virtual machine, a container, or a physical computer.

18. The API gateway cluster control method of claim 15, wherein the load parameter of the API gateway cluster indicates usage of resources of the API gateway cluster.

19. The API gateway cluster control method of claim 15, further comprising sets a blacklist in the API gateway cluster or scales out or scales in the API routing apparatus based on the load parameter of the service provisioning system.

* * * * *